UNITED STATES PATENT OFFICE.

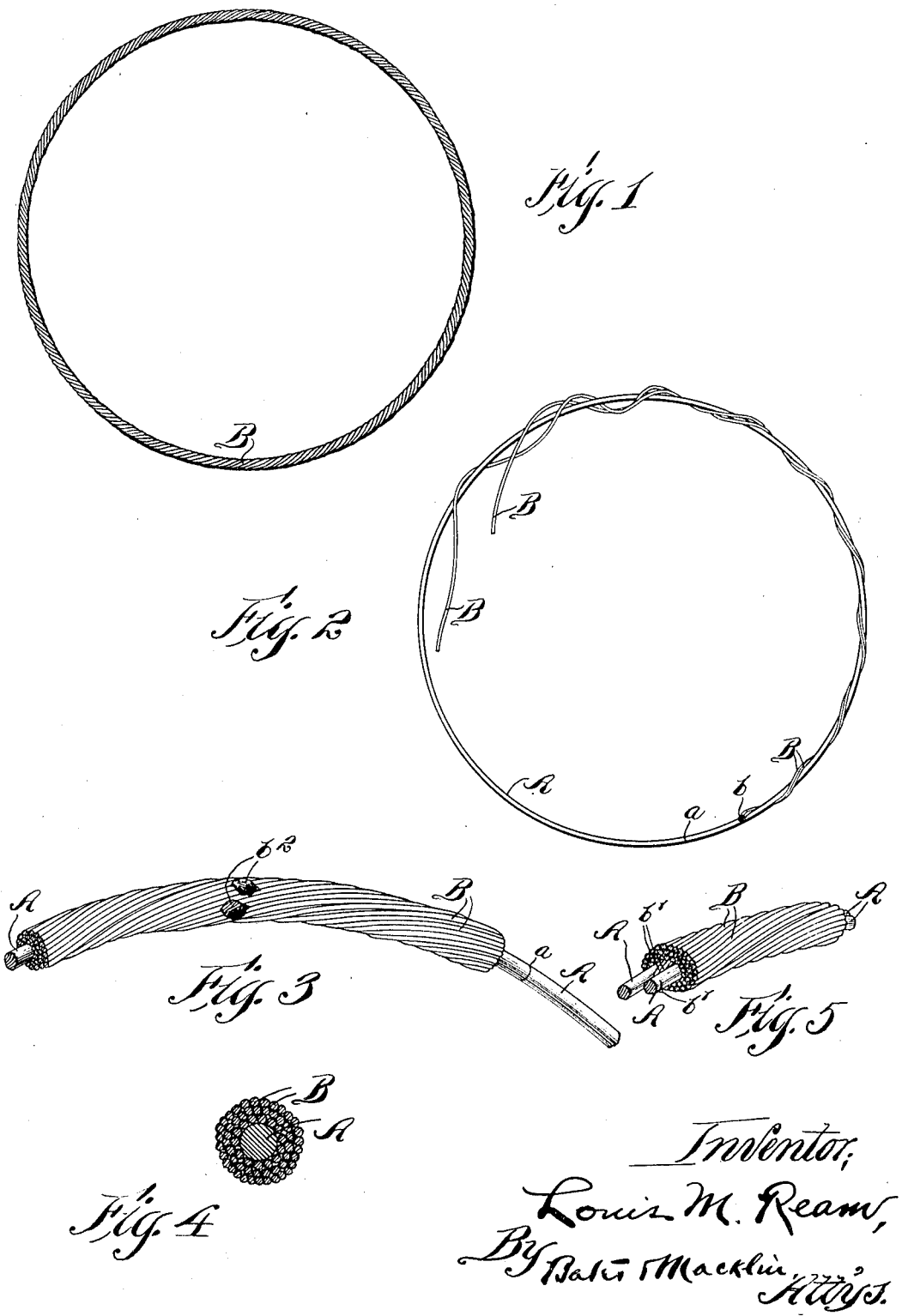

LOUIS M. REAM, OF THOMPSON, CONNECTICUT.

REINFORCING MEMBER FOR TIRE-BEADS AND METHOD OF MAKING SAME.

1,270,053.      Specification of Letters Patent.      Patented June 18, 1918.

Application filed September 27, 1917. Serial No. 193,402.

*To all whom it may concern:*

Be it known that I, LOUIS M. REAM, a citizen of the United States, residing at Thompson, in the county of Windham and State of Connecticut, have invented a certain new and useful Improvement in Reinforcing Members for Tire-Beads and Methods of Making the Same, of which the following is, a full, clear, and exact description, reference being had to the accompanying drawings.

In the manufacture of tire casings, particularly those having what are called "straight sides," it is customary to strengthen the bead of the casing by embedding in it an annular metallic reinforcing member. Frequently this metallic member consists of a continuous coil of comparatively light wire, making a succession of substantially annular loops adjacent to each other. This has been found expensive in properly coiling and holding wire and in manipulating coil in the manufacture of the casing. To reduce this expense it has been proposed to take a cable composed of a central strand and a number of outside strands and bend it into an annular loop and weld the end together. This has been found unsatisfactory; because, before the central strand becomes hot enough for welding, the small outer strands have been fused by the heat, or, if the welding heat is proper for securing the ends of the fine wires the core does not receive sufficient temperature. Accordingly, in either case a poor weld is made.

It has also been proposed to use a core ring and twist a heavy wire in a long spiral about the core until a ply is effected, and then braze together the two ends of such wound wire. This makes a difficult operation in holding the first end of the wire in place until the ply is completed and the brazing effected, and, if the ring is to have the desired strength, it is unduly stiff.

I have discovered that a very desirable and effective reinforcing ring for tire beads may be constructed by taking a wire of considerable cross section and bending it into an annular loop and welding the ends together to make a ring, and using one or more of these rings as a core about which a plurality of plies of much smaller wire are thereafter wound. I use one or more small wires, securing the inner ends thereof to the core, and make the winding in long spirals which take several trips about the annulus until the same is completely covered, several wires deep; and then I secure the outer ends of the small wires in place adjacent previously laid portions thereof.

By securing the inner ends of the winding wire to the core itself and the outer ends to a previously laid portion of the fine wire, I obtain a much easier winding operation than if it were attempted to hold one end of a winding wire and thereafter secure it to the other end, after the winding has been effected. I am also enabled to wind the wires several plies deep, as stated, and this enables me to build up a ring of the required strength with several plies of fine wire, whereby the desired flexibility is maintained.

In making my device, the welding of the core and the securing of the ends of the wires are distinct and separate operations, and a firm juncture may be effected at a minimum of cost, while the resultant ring is very strong, and has the desired flexibility, as well as having a surface well adapted for the adherence of the rubber in the tire bead.

My invention includes the novel reinforcing member above described, as well as the process of making it. The invention is hereinafter more fully described and its essential characteristics are summarized in the claims.

The drawings closely disclose my reinforcing member. Figure 1 is a side elevation of the device complete; Fig. 2 is a side elevation of the core and two embracing wires secured to it and partially wound about it. This view shows the free ends of the wires loose for convenient illustration. In practice the wires are maintained taut and travel several times about the core annulus to produce the entirely covered structure shown in Fig. 1. Fig. 3 is an enlarged side elevation of a portion of the completed reinforcing member; Fig. 4 is an enlarged cross section of this member; Fig. 5 is a partial perspective of my reinforcing ring made with two core wires. This is intended to illustrate the employment of any plural number of core wires.

As shown in Figs. 2 and 3, A indicates the core of my reinforcing ring. As shown, this consists of a single wire formed into an annulus and having its ends butt-welded together as indicated at *a*. One or more of these wires are used to make the core.

B in each of the figures indicates the small wire winding around the core. This winding is made by one or more fine wires secured at one end directly to the core and wound about it in a long open spiral as shown in Fig. 2. Several complete trips about the annulus are necessary before the core is completely covered with a single layer of fine wires. Then the same open spiral winding is continued until there are a plurality of layers about the core. Figs. 3, 4 and 5 show three layers wound in this manner. At the end of the winding operation, the wires are severed from the spools on which the wire has been wound and the free ends are secured to previously laid portions of the winding.

The inner ends of the wire or wires B are secured directly to the core in a suitable manner. As shown in Fig. 2 they are welded or brazed to it at *b*. If a plurality of core wires are employed, as illustrated in Fig. 5, the winding wires may have their inner ends held by being pinched between the core wires as shown at *b'*.

I find it desirable to wind a plurality of fine wires at a time about the core. Thus, in Fig. 2 two wires B are shown secured to the core wire A, and are conventionally illustrated in their progress of being wound about it.

As already stated, the outer ends of the winding wires are suitably secured to the previously laid winding. I find this may be very satisfactorily effected by welding, or brazing these outer ends to the winding wires, as illustrated in Fig. 3 at $b^2$.

By causing the winding wires to take the long open spiral form shown great tensile strength is obtained in the resulting ring. At the same time, by using fine wires and a plurality of plies, the ring has the desired flexibility. The butt-welded ends of the core are strong and amply able to stand the strain put upon the core. The strain through the winding is distributed over the large number of turns of fine wire, and thus the strain either at the inner point of fastening *b* or the outer point $b^2$ is slight.

Having thus described my invention, what I claim is:

1. A reinforcing ring for tire beads comprising a metallic core made of an annular loop welded to produce a continuous ring, and a separate wire wound about the core in spiral form to make a plurality of plies, the ends of the winding wire being secured independently of each other and independently of the securing of the core member itself.

2. A reinforcing ring for tire beads comprising a continuous annular core and a smaller wire having its inner end secured to the core and wound about the same in a spiral form and having its outer end secured to a previously laid portion of the winding.

3. A reinforcing ring for tire beads consisting of a continuous annular comparatively large core and a comparatively fine winding secured at its inner end to the core and wound about the same spirally to entirely cover the core, and making a plurality of layers about the core.

4. A reinforcing ring for tire beads consisting of a metallic wire butt-welded at its ends to make a continuous ring, and a separate wire secured at one end directly to the core independently of such butt-weld and winding spirally about the core and making several complete trips about it to cover it with a plurality of plies.

5. A reinforcing ring for tire beads consisting of a metallic wire butt-welded at its ends to make a continuous core ring, and a winding of smaller wires secured at their inner ends to the core and winding about it in open spirals making several complete trips about the annulus to entirely cover it, said winding being continued to make several superposed layers, and the outer ends of the wires being secured to a previously laid winding thereof independently of the securing of the inner ends.

6. A reinforcing ring for tire beads consisting of a closed annular metallic core complete in itself and a plurality of separate wires secured at their inner ends to the core and wound about it side by side and in parallelism to completely cover the core.

7. A reinforcing ring for tire beads comprising a continuous annular comparatively heavy metallic core, and a plurality of comparatively light wires having their inner ends secured to the core and wound about the same side by side in a spiral form until a plurality of layers has been laid, said wires having their outer ends secured to a previously laid portion of the winding.

8. A reinforcing ring for tire beads comprising a core having a plurality of annular rings side by side, a winding wire having its inner end caught between the core rings, said wire being wound in spiral form about the plurality of rings.

9. In a reinforcing member for tire beads, the combination of a plurality of annular metallic rings adjacent to each other, and a winding comprising a plurality of small wires having their ends caught between adjacent rings, said wires then being wound in an open spiral for a plurality of trips about the set of core rings as a whole and completely inclosing them by several layers of winding, the outer ends of the wires being secured in place independently of the inner ends.

10. The method of making reinforcing rings for tire beads consisting of welding a core wire into an annular ring, securing a separate wire directly to such core, then winding it in an open spiral about one or more of such core wires for several trips until the core is entirely inclosed, and securing the outer end of the winding wire.

11. The method of making reinforcing rings for tire beads consisting of taking a completely annular core and securing the inner end of a separate winding wire to it, winding such wire in an open spiral about the core wire for several trips until the core wire is inclosed with a plurality of plies of wound wire, then securing the outer end of the winding wire.

12. The method of making reinforcing members for tire beads consisting of butt-welding into an annular ring a core wire, securing to such wire the inner end of a plurality of other wires, winding such plurality of wires in parallel form about the core wire until it is completely covered, and securing the outer ends of the winding wires.

13. The method of making reinforcing rings for tire beads consisting of taking a plurality of annular core wires, holding these wires adjacent and catching between them the inner end of a winding wire, winding such wire in a continuous open spiral about the set of core wires until the core wires are entirely inclosed, and thereafter securing the outer end of the winding wire against a previously laid portion of such wire.

14. The method of making reinforcing rings for tire beads consisting of independently butt-welding into annular rings a plurality of core wires, holding these wires adjacent and catching between them the inner ends of a plurality of fine wires, winding such fine wires together about the set of core wires until the core wires are entirely inclosed with a plurality of plies of winding and thereafter securing in place the outer ends of the winding wires against previously laid portions thereof.

In testimony whereof, I hereunto affix my signature.

LOUIS M. REAM.